United States Patent
Kampe

(10) Patent No.: US 7,554,667 B1
(45) Date of Patent: Jun. 30, 2009

(54) METHOD AND APPARATUS FOR CHARACTERIZING HYPERSPECTRAL INSTRUMENTS

(75) Inventor: Thomas Ulrich Kampe, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 141 days.

(21) Appl. No.: 11/465,700

(22) Filed: Aug. 18, 2006

Related U.S. Application Data

(60) Provisional application No. 60/711,516, filed on Aug. 25, 2005.

(51) Int. Cl.
G01J 3/45 (2006.01)
(52) U.S. Cl. ...................... 356/454; 356/328
(58) Field of Classification Search .......... 356/451, 356/454, 480, 519, 456, 326, 328
See application file for complete search history.

(56) References Cited

U.S. PATENT DOCUMENTS

| | | | |
|---|---|---|---|
| 5,357,340 A * | 10/1994 | Zochbauer | 356/454 |
| 7,030,991 B1 | 4/2006 | Kampe et al. | |
| 7,050,215 B1 | 5/2006 | Johnson et al. | |
| 7,327,896 B1 | 2/2008 | Singh et al. | |
| 7,391,520 B2 * | 6/2008 | Zhou et al. | 356/479 |
| 2002/0080353 A1 * | 6/2002 | Fuhrmann et al. | 356/328 |
| 2005/0162649 A1 * | 7/2005 | Kryszczynski et al. | 356/328 |
| 2007/0252988 A1 * | 11/2007 | Levy | 356/328 |

OTHER PUBLICATIONS

Goodman, D.S., edited by Daniel Malacara, "Geometrical and Instrumental Optics", Basic Optical Devices, vol. 25, pp. 217-222, Published by Academic Press, Inc., 1988.
T. U. Kampe, "SIRAS-G: the Spaceborne Infrared Atmospheric Sounder: laboratory instrument development" Proceedings SPIE, vol. 5523, Current Developments in Lens Design and Optical Engineering V, pp. 39-50, 2004.
Larar, A.M., et al. "Global Troposheric and Total Ozone Monitoring with a Double-Etalon Fabry-Perot Interferometer—I. Instrument Concept." Applied Optics. vol. 37, No. 21. Jul. 20, 1998.
Analysis of Hyperspectral Imagery. http://www.csr.utexas.edu/projects/rs/hrs/analysis/html. pp. 1-3, Printed Jul. 5, 2006. Published Aug. 28, 1999.

(Continued)

*Primary Examiner*—Tarifur Chowdhury
*Assistant Examiner*—Jonathan M Hansen
(74) *Attorney, Agent, or Firm*—Sheridan Ross P.C.

(57) ABSTRACT

A method and apparatus for characterizing the spectral response function of hyperspectral electro-optical instruments or imaging spectrometers are provided. The system includes a test instrument that provides energy comprising multiple discrete wavelengths to the entrance slit of an instrument under test simultaneously. The provided energy can be scanned in the spectral dimension by changing the optical distance between the plates of a Fabry-Perot etalon incorporated into the test instrument. In addition, the energy provided to the instrument under test can be scanned in the spatial dimension by changing the location along the slit of the instrument under test at which the energy from the test instrument is provided.

11 Claims, 10 Drawing Sheets

OTHER PUBLICATIONS

Processing of Hyperspectral Imagery. http://www.csr.utexas.edu/projects/rs/hrs/process.html. pp. 1-4, Printed Jul. 5, 2006. Published Aug. 28, 1999.

Hyperspectral Remote Sensing. http://www.csr.utexas.edu/projects/rs/hrs/hyper/html. pp. 1-3, Printed Jul. 5, 2006. Published Aug. 28, 1999.

Remote Sensing Tutorial Introduction, Part 2, p. 24. "RST Introduction- Technical and Historical Perspectives of Remote Sensing." http://rst.gsfc.nasa.gov/Intro/Part2._24.html. Printed Jul. 5, 2005. Published May 19, 2006.

National Aeronautics and Space Administration- NASA Research Announcements. http://research.hq.nasa.gov/code_y/nra/current/nra-02-oes-03/winners.html. pp. 1-3. Printed Aug. 16, 2006. Published in 2003.

HES- Hyperspectral Environment Suite. http://cimss.ssec.wisc.edu/goes/hes/hes_homepage.html. Printed Aug. 16, 2006. Last modified in 2005.

T. U. Kampe, "SIRAS-G: the Spaceborne Infrared Atmospheric Sounder fore Geosynchronous Earth Orbit" Proceedings SPIE, vol. 5157. Published in 2005.

Strow, L.L., et al. "Prelaunch Spectral Calibration of the Atmospheric Infrared Sounder (AIRS)." IEEE Transactions on Geoscience and Remeote Sensing, vol. 41, No. 2, Feb. 2003.

Mouroulis, P., et al. "Design of Pushbroom Imaging Spectrometers for Optimum Recovery of Spectroscopic and Spatial Information." Applied Optics. vol. 39, No. 13. May 1, 2000.

Green, R., "Spectral Calibration Requirement for Earth-Looking Imaging Spectrometers in the Solar-Reflected Spectrum." Applied Optics. vol. 37, No. 4. Feb. 1, 1998.

Brazile, J., et al. "Scene-Based Spectral Response Function Shape Discernibility for the APEX Imaging Spectrometer." IEEE Transactions on Geoscience and Remeote Sensing, vol. 3, No. 3, Jul. 2006.

T. U. Kampe, "SIRAS-G: the Spaceborne Infrared Atmospheric Sounder: Applications in Earth Science." Proceedings SPIE, vol. 58650C-1.

Larar, A.M., et al. "Global Troposheric and Total Ozone Monitoring with a Double-Etalon Fabry-Perot Interferometer—II. Feasibility Analysis." Applied Optics. vol. 37, No. 21. Jul. 20, 1998.

V. Nirmal Kumar and D. Narayana Rao, "Determination of the Instrument Function of a Grating Spectrometer by Using White-Light Interferometry," Applied Optics, vol. 36, No. 19, pp. 4535-4539 (Jul. 1, 1997).

Jacquinot, Pierre, "The Luminosity of Spectrometers with Prisms, Gratings, or Fabry-Perot Etalons," Journal of the Optical Society of America, vol. 44, No. 10, pp. 761-765 (Oct. 1954).

* cited by examiner

METHOD AND APPARATUS FOR CHARACTERIZING HYPERSPECTRAL INSTRUMENTS

CROSS REFERENCE TO RELATED APPLICATIONS

This application claims the benefit of U.S. Provisional Application No. 60/711,516, filed Aug. 25, 2005, the entire disclosure of which is hereby incorporated herein by reference.

FIELD

Methods and systems to measure key optical performance parameters for characterizing the performance of hyperspectral instruments in an efficient and accurate manner are disclosed.

BACKGROUND

Hyperspectral electro-optical instruments or imaging spectrometers spread received light over an area array, and can be used in a "pushbroom" fashion to build up an image at a number of finely spaced wavelengths. Hyperspectral instruments, particularly wide field of view imaging spectrometers, are beginning to be seen as the instrument of choice on key future remote sensing programs. In the Earth Sciences, there are several proposed programs that require high performance infrared (IR) hyperspectral instruments. These include the Hyperspectral Environmental Suite (HES) on the Geostationary Operational Environmental Satellites (GOES), the Atmospheric Infrared Sounder (AIRS) and the Spaceborne Infrared Atmospheric Sounder for Geosynchronous Orbit (SIRAS-G) Instrument Incubator Program. Other proposed programs include atmospheric sounding instruments for Blue Horizons and Atmospheric Chemistry missions. Other hyperspectral instruments have also been proposed. The ability to validate and characterize the performance of a hyperspectral instrument is a critical aspect of developing and effectively deploying this class of instrument.

With hyperspectral instruments, one of the most difficult and important performance parameters to characterize is the spectral response function (SRF). The SRF is the convolution of the slit response function, the detector, and the spectral response of the instrument. However, systems and procedures for determining the SRF of a hyperspectral instrument have been limited in their capabilities. For example, laser sources have typically been required in order to produce monochromatic energy. However, using lasers as a monochromatic source is difficult where source energy across a wide range of wavelengths is desired. In addition, systems using lasers have only been capable of providing one wavelength of energy to an instrument under test at any one time. Also, lasers produce a point source, so that only one pixel of the instrument under test is illuminated at any one time. As a result of these disadvantages, characterization of an instrument's spectral response function, spectral smile, keystone distortion, and MTF is difficult and inefficient.

Other test systems, in particular the Fourier transform spectrometer, provide a full spectrum of wavelengths simultaneously as a source. However, determining performance characteristics of the system under test requires a large amount or processing, including transforms between Fourier space and instrument space. In addition, signal to noise ratios can be a problem.

SUMMARY

The present invention is directed to solving these and other problems and disadvantages of the prior art. In accordance with embodiments of the present invention, energy at a plurality of spaced apart wavelengths is provided to an instrument under test. Moreover, energy comprising a set or "comb" of transmission lines that includes a plurality of spaced apart wavelengths is provided to the instrument. Accordingly, a plurality of transmission lines may be generated simultaneously. In order to provide energy across the full spectral range of the instrument under test, and at all wavelengths of interest, the comb of transmission lines may be scanned in wavelength space. Accordingly, unlike measurements using fixed or scanning laser sources, embodiments of the present invention allow the performance of an instrument or unit under test to be characterized at multiple spectral lines simultaneously. In addition, the comb or combs of transmission lines may be spatially scanned, in order to obtain test data regarding an instrument under test in a spatial dimension.

In accordance with embodiments of the present invention, the energy at a plurality of spaced apart wavelengths is produced using a Fabry-Perot etalon in combination with a radiation source. The radiation source may comprise a blackbody radiation source providing energy at a range of wavelengths. In accordance with further embodiments of the present invention, energy from the radiation source is provided to the Fabry-Perot etalon via a pinhole or slit and collimating optics. In addition, an objective lens or lenses may be provided to direct output from the Fabry-Perot etalon to the slit of the instrument under test.

In accordance with embodiments of the present invention, the spectral lines comprising the transmission function of the Fabry-Perot etalon are scanned in wavelength space by adjusting the etalon spacing. Accordingly, the Fabry-Perot etalon may comprise an air gap device having provisions for translating the etalon plates or elements to adjust the etalon spacing. In accordance with other embodiments of the present invention, tilt scanning or temperature scanning can be used to adjust the optical path between the etalon plates. In accordance with still other embodiments of the present invention, multiple Fabry-Perot etalons can be applied in series.

In accordance with embodiments of the present invention, energy produced by a radiation source is collimated and passed through a Fabry-Perot etalon. The energy output by the Fabry-Perot etalon is generally characterized by a number of equally spaced transmission lines or peaks. The multiple transmission peaks are then imaged on to the slit of an instrument under test. The location of the transmission peaks in wavelength space is scanned by adjusting the effective spacing of the etalon plates, allowing the performance of the instrument under test to be characterized across a range of wavelengths. Moreover, the amount by which the wavelengths output to the instrument under test are scanned or changed between data collection points can be selected, to obtain a desired resolution. Because multiple wavelengths are provided to the instrument under test simultaneously, test procedures can be performed more quickly than when using sources that provide a single wavelength at a time. In addition, because each wavelength provided to the instrument under test in a set of wavelengths is known and discrete (i.e. is essentially monochromatic), processing of the response of the instrument under test in order to characterize that instrument's performance is simplified.

The output provided from the test instrument to an instrument under test may also be spatially scanned, in order to obtain performance characteristics related to the spatial performance of the instrument under test. Spatial scanning may be performed through the use of steering mirrors or by moving the test instrument relative to the instrument under test.

Additional features and advantages of embodiments of the present invention will become more readily apparent from the following discussion, particularly when taken together with the accompanying drawings.

DETAILED DESCRIPTION

Figure 1:
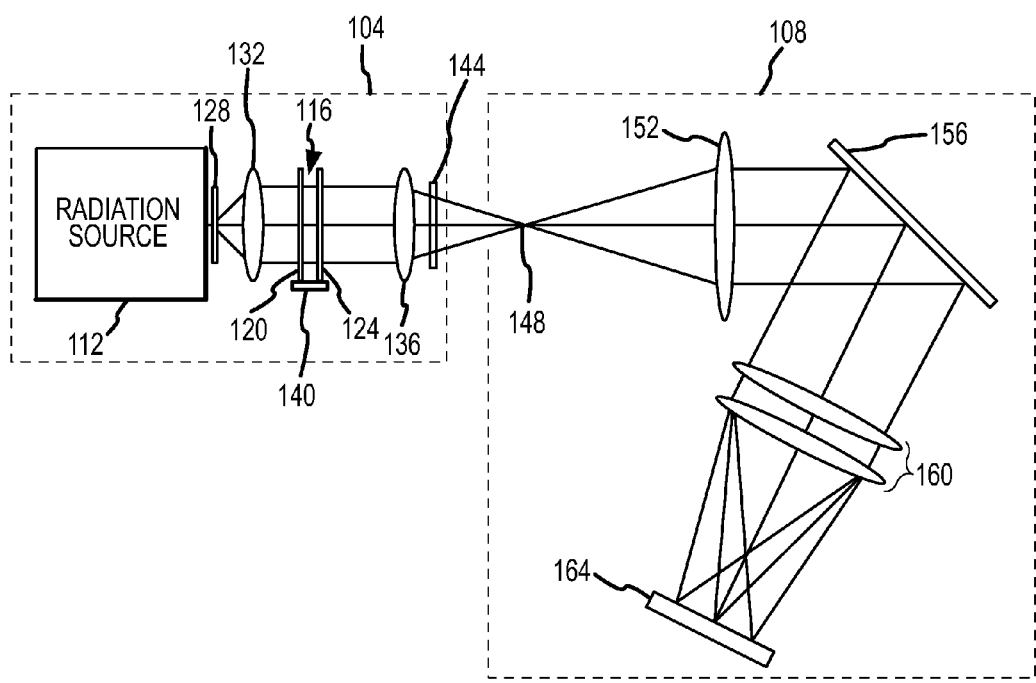
FIG. 1 is a schematic diagram depicting components of a test instrument and components of an instrument under test in accordance with embodiments of the present invention.

FIG. 1 schematically depicts components of a test instrument 104 in accordance with embodiments of the present invention, in relation to components of a unit or instrument under test 108. In general, the test instrument 104 includes a radiation or energy source 112. For example, the radiation source 112 may comprise a black body radiation source. for providing energy in the infrared portion of the spectrum. As another example, the radiation source 112 may comprise a high intensity lamp for providing energy in the visible portion of the spectrum. The test instrument 104 additionally includes a Fabry-Perot etalon 116 comprising at least first 120 and second 124 etalon plates. The Fabry-Perot etalon 116 is arranged to receive output from the radiation source 112. In order to avoid spectral broadening of the output from the Fabry-Perot etalon 116, collimated radiation should be provided as an input. Accordingly, the test instrument 104 may include a pinhole or slit 128, together with a collimating optic 132 to effectively provide a point source at infinity. As can be appreciated by one of skill in the art, the collimating optic 132 may comprise a number of optical elements. The test instrument 104 may additionally include an objective optic 136 for imaging the output of the Fabry-Perot etalon 116 onto the slit of the unit under test 108.

One or both of the etalon plates 120, 124 may be associated with a wavelength scanning mechanism 140. The wavelength scanning mechanism may comprise, for example, a piezoelectric or other actuator for translating the etalon plates 120, 124 with respect to one another, to adjust the etalon spacing or the optical distance between the etalon plates 120, 124, and therefore the wavelengths of energy output by the Fabry-Perot etalon 116. As another example, the wavelength scanning mechanism 140 may comprise a mechanism for tilting the Fabry-Perot etalon 116 to change the optical distance between the etalon plates 120, 124. In accordance with still other embodiments of the present invention, the wavelength scanning mechanism 140 may comprise a temperature control device and the output of the Fabry-Perot etalon 116 may be temperature scanned by changing the temperature of a solid etalon to change the index of refraction and therefore change the optical distance between the etalon plates 120, 124. In accordance with still other embodiments of the present invention, a number of wavelength scanning mechanisms 140 can be used in combination. In addition, a first Fabry-Perot etalon 116 having a first effective range of output wavelengths can be substituted for a Fabry-Perot etalon 116 having a second effective range of output wavelength that is different from the first, in order to cover the complete operating range of an instrument under test 108.

The test instrument 104 may additionally include one or more spatial scanning elements 144. Examples of spatial scanning elements 144 include one or more steering mirrors. A spatial scanning element 144 may alternatively or additionally comprise a mechanism for translating or otherwise moving the position of the test instrument 104 with respect to the unit under test 108.

The instrument or unit under test 108 typically comprises an imaging spectrometer or hyperspectral instrument. The instrument under test 108 generally includes a slit 148 that allows a fine line of received energy to pass to an optic 152 that projects the received energy onto a dispersive element, such as a dispersion grating 156. The dispersion grating 156 operates to separate the received energy into component wavelengths. The received energy can then be passed through additional optical elements 160 and focused onto a sensor array 164 at the focal plane of the unit under test 108. As can be appreciated by one of skill in the art, different columns (or alternatively, different rows) of pixels or sensor elements in the sensor array 164 generally receive energy at different wavelengths, and energy received from different locations relative to the instrument under test 108 is generally directed to different rows (or alternatively, different columns) of pixels in the sensor array 164.

Figure 2:
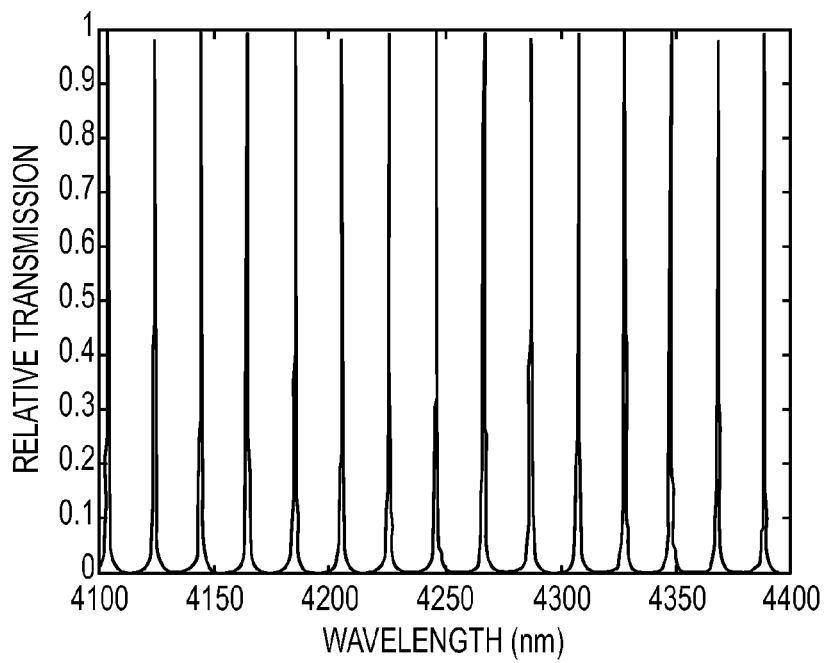
FIG. 2 depicts the output of a test instrument in accordance with embodiments of the present invention.

FIG. 2 illustrates an example set of wavelengths output by a test instrument 104 at a particular Fabry-Perot etalon 116 setting. In general, the test instrument 104 provides as an output a series of narrow spectral lines simultaneously from a single point source. The Fabry-Perot instrument function is defined by the Airy function and is a comb of regularly spaced transmission peaks or lines in wavelength space.

$$\text{Airy function: } \tau(m) = \frac{T^2}{1 + R^2 - 2R\cos(2\pi m)}$$

Where: m=order; R=surface reflectance of the etalon plates 120, 124; and T=surface transmittance of the etalon plates In the example shown, the output wavelengths have a relatively high finesse. That is, each wavelength output by the test instrument at a single point in time is narrowly defined and therefore is essentially monochromatic. This can be achieved through the use of etalon plates 120, 124 having a high surface reflectance, which has the effect of limiting the range of wavelengths that escape the Fabry-Perot etalon 116. More particularly, the wavelengths at which transmission is peaked is determined by the optical path length between the etalon plates 120, 124. Furthermore, the transmission peaks occur at successive orders as defined by the Airy function. The instrument function of the Fabry-Perot etalon 166 is therefore periodic, and the separation between adjacent transmission peaks is defined by the free spectral range (FSR). By providing well defined (i.e. narrow) spectral lines, key performance tests needed to fully characterize the performance of a hyperspectral instrument 108 can be performed. Moreover, the instrument function of the test instrument 104 is well characterized by a Lorentzian function and therefore can be easily deconvolved from the test data, providing a direct measure of the unit under test 108 instrument response function.

Figure 3:
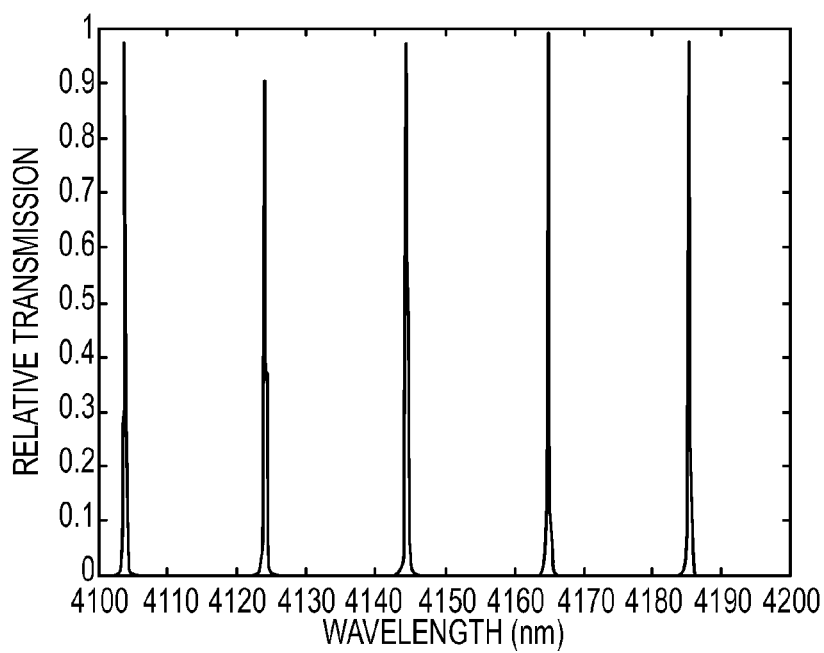
FIG. 3 depicts the output of a test instruments in accordance with other embodiments of the present invention.

In certain circumstances, it may be desirable to sample fewer spectral lines simultaneously. For example, this can be done to avoid signal bleed from one spectral image into a neighbor image at the focal plane. The free spectral range can be increased by using two or more etalons 116 in series. More particularly, the ratio of the spacing of the etalons may be of two integers. According to such an arrangement, some of the transmission maxima of the individual Fabry-Perot etalon 116 overlap and the instrument function of the test instrument 104 is the product of the multiple etalons 116. An example of transmission maxima produced by a test instrument 104 having multiple Fabry-Perot etalons 116 is illustrated in FIG. 3. According to this example, two Fabry-Perot etalons 116 having a two-to-one spacing ratio with respect to one another are utilized. In such an arrangement, the free spectral range is that of the thinner (i.e. lower resolution) etalon 116, and the resolution is somewhat improved over that of the thicker (i.e. high spectral resolution) etalon 116, since the product of the two Fabry-Perot instrument functions is narrower than either. The use of multiple Fabry-Perot etalons 116 can be employed to produce the desired number of spectral lines sampled across the array 164 of the unit under test 108. In addition, the use of multiple Fabry-Perot etalons 116 can provide improved spectral resolution and decrease transmissions between transmission lines, resulting in lower noise. Moreover, the spacing ratio is variable if air spaced etalons 116 or other etalons 116 in which the optical distance between the plates 120, 124 can be varied are used.

Figure 4:
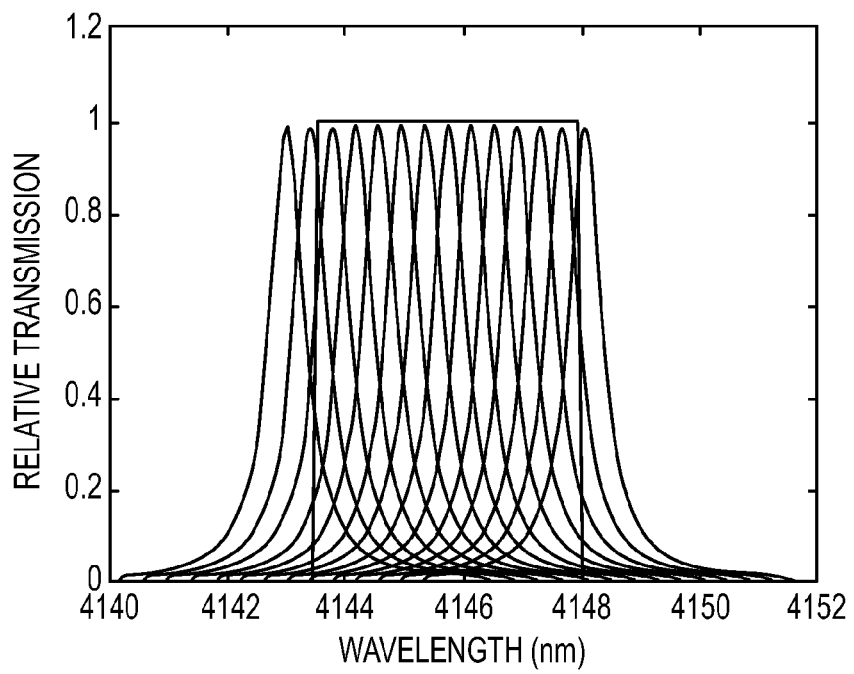
FIG. 4 depicts the scan of the Fabry-Perot instrument function across a single spectral response element of an instrument under test, as defined by instrument slit, in accordance with embodiments of the present invention.
Figure 5:
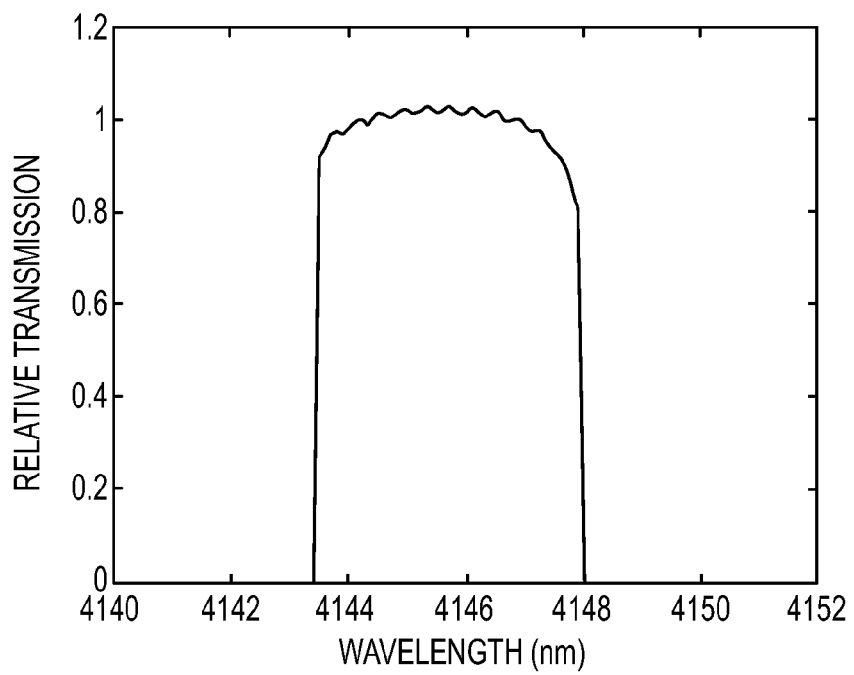
FIG. 5 depicts the convolution of the Fabry-Perot instrument response with slit to yield the instrument spectral response function.

An example scan of a test instrument 104 instrument function across the spectral response of a single pixel of an instrument under test 108 is depicted in FIG. 4. In particular, FIG. 4 shows a scan of energy at a number of different wavelengths received at a single pixel included in the sensor array 164 of an instrument under test 108 that is nominally responsive to energy at wavelengths from about 4143.5 nm to about 4148 nm. Because of the close spacing between the received wavelengths, in this example the different wavelengths are provided to the example pixel sequentially by incrementally adjusting the optical distance between the plates 120, 124 of the etalon 116. The spectral response function (SRF) is the convolution of the spectral response of the test instrument 104 and the instrument function of the unit under test 108. The convolution of the instrument function of the example test instrument 104 instrument function (shown in FIG. 4) with the instrument function of an example unit under test 108 is depicted in FIG. 5. Assuming the Fabry-Perot spectral response for the test instrument 104 is smaller than that of the unit under test 108, the Fabry-Perot instrument function can be scanned across the slit 108 in wavelength space and the spectral response of the unit under test 108 can be subsampled. By adjusting the optical distance between the etalon plates 120, 124, the wavelength of maximum transmission is adjusted and the spectral response function can be measured directly. The width of the spectral response function can be determined by measuring the spectral response function full width half maximum (FWHM) across a single pixel or spectral response element of the sensor array 164. If the spectral response function were to change due to spectral smile across the length of the slit 148, then the centroid of the spectral response function at FWHM would shift in wavelength space, and this can be determined directly from the SRF measurement.

Because the test instrument 104 can provide multiple spectral lines simultaneously, a number of wavelengths can therefore be sampled simultaneously at the sensor array 164. This simultaneity in measurement for spectral lines or very narrow bands also immediately allows for a direct measurement of keystone distortion, since all spectral lines originate from the same spatial location at the slit 148 plane. Different positions along the length of the slit 148 can be sampled by translating the test instrument 104 in a precision stage so that the image of the pinhole 128 is translated along the slit 148.

Figure 6:
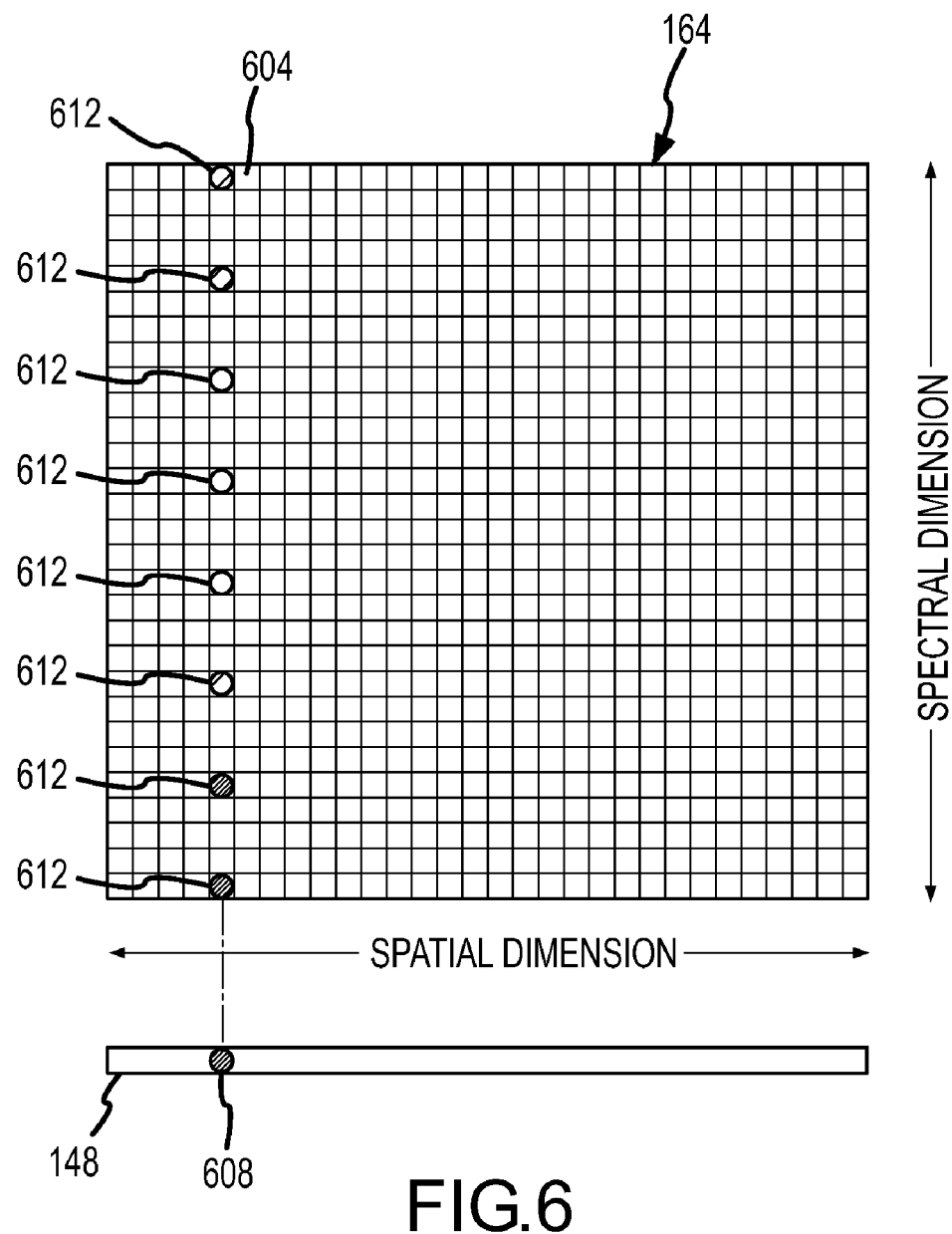
FIG. 6 depicts the output from a test instrument in relation to pixels in a sensor array of an instrument under test in accordance with embodiments of the present invention.

In FIG. 6 the sensor array 164 at the focal plane of an instrument under test 108 is depicted. The sensor array 164 includes a number of pixels 604 arranged in rows and columns. In the example array 164 illustrated in FIG. 6, the rows of pixels 604 represent the spectral dimension, while the columns of pixels 604 represent the spatial dimension. Accordingly, different wavelengths that are imaged onto the sensor array 164 will generally be incident upon different rows of the sensor array 164. Energy from different positions along the slit 148 of the instrument under test 108, but within the instrument's field of view, will be incident upon different columns of pixels 604 included in the sensor array 164. Also depicted in FIG. 6 is the entrance slit 148 of the instrument under test 108. For a set of wavelengths provided to the slit 148 of the instrument under test 108 at a particular point 608 along the slit 148, each of the transmission peaks of the energy input to the instrument under test 108 by the test instrument 104, shown as spots 612, will generally be confined to a single column of pixels 604, but different rows of pixels 612, as a result of the difference in wavelengths. By changing the spacing between the plates 120, 124 of the Fabry-Perot etalon 116, the individual transmission lines can be shifted in the spectral dimension, so that they are incident on different rows of pixels 604. Because the wavelengths of the transmission peaks for a particular Fabry-Perot etalon 116 setting of a test instrument 104 are known, the response of the instrument under test 108 to those wavelengths can be determined and used to characterize the response of the instrument under test 108. Moreover, because the instrument function of the test instrument 104 can be characterized, the effects of that instrument function can be removed from the test results.

Figure 7:
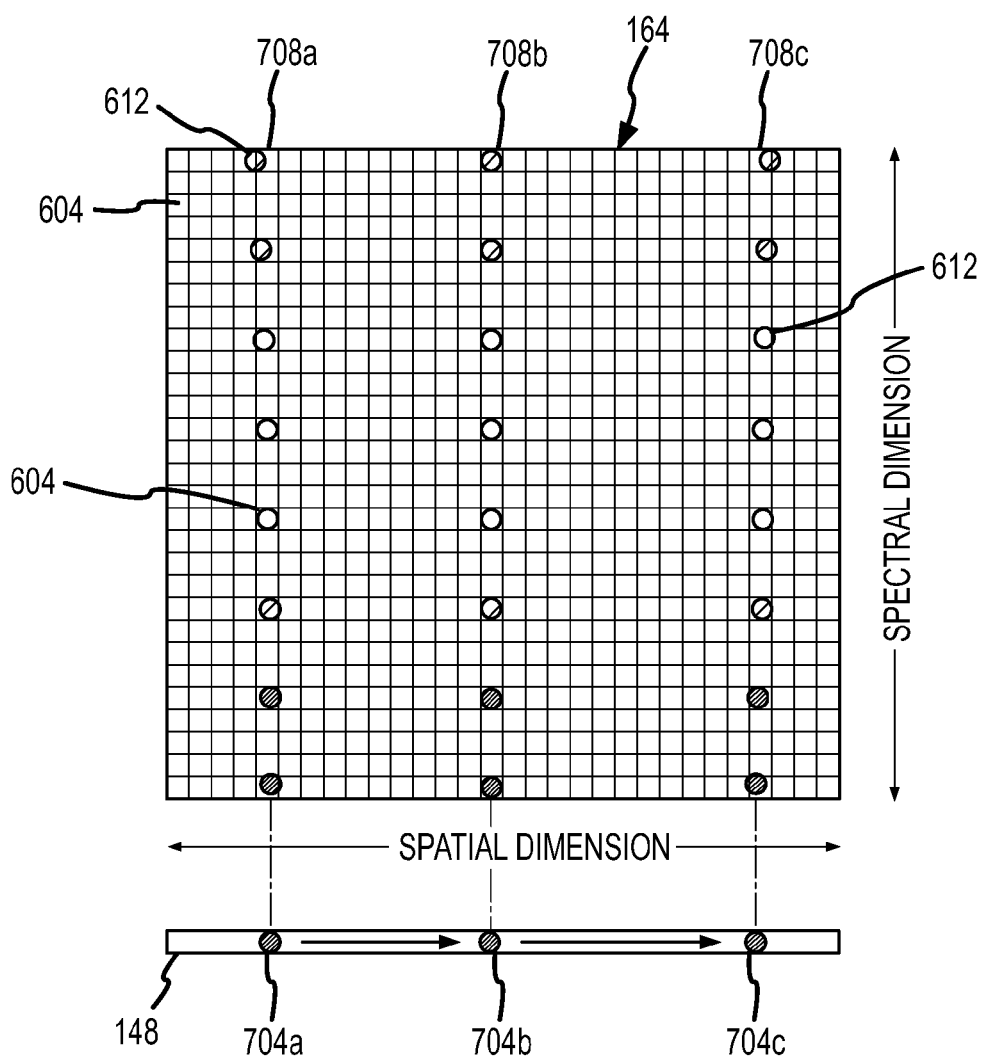
FIG. 7 depicts keystone distortion of an instrument under test in accordance with embodiments of the present invention.

FIG. 7 illustrates the effect of scanning energy comprising a set of transmission lines provided by a test instrument 104 in a spatial dimension with respect to the instrument under test 108. In particular, when energy is provided at a first point 704a with respect to the slit 148 of the instrument under test 108, the transmission lines fall on or near pixels 604 included in or near a first column 708a of the sensor array 164. When the test instrument 104 is spatially scanned with respect to the instrument under test 108, such that energy is provided at a second point 704b along the slit 148 of the instrument under test 108, energy corresponding to the transmission lines of the test instrument 104 falls within or near pixels 604 included in a second column 708b of pixels. Likewise, when the test instrument 104 is spatially scanned such that energy is provided at a third point 704c along the slit 148 of the instrument under test 108, the energy at wavelengths corresponding to the transmission lines of the test instrument 104 falls on or near pixels 604 included in a third column 708c.

FIG. 7 also illustrates keystone distortion, which is the departure of measured images corresponding to different wavelengths received at a point 704 along the slit 148 of the instrument under test 108 from a perfectly straight line that is parallel to the columns 708 of pixels 604 of the sensor array 164. Accordingly, keystone distortion in an instrument under test 108 can be detected by determining that, for a single set of wavelengths provided to the instrument under test 108 simultaneously, different columns of pixels 604 receive energy at different intensities (i.e. a line drawn through the centroid of the received wavelengths is not parallel to the columns 708 of pixels 604).

Figure 8:
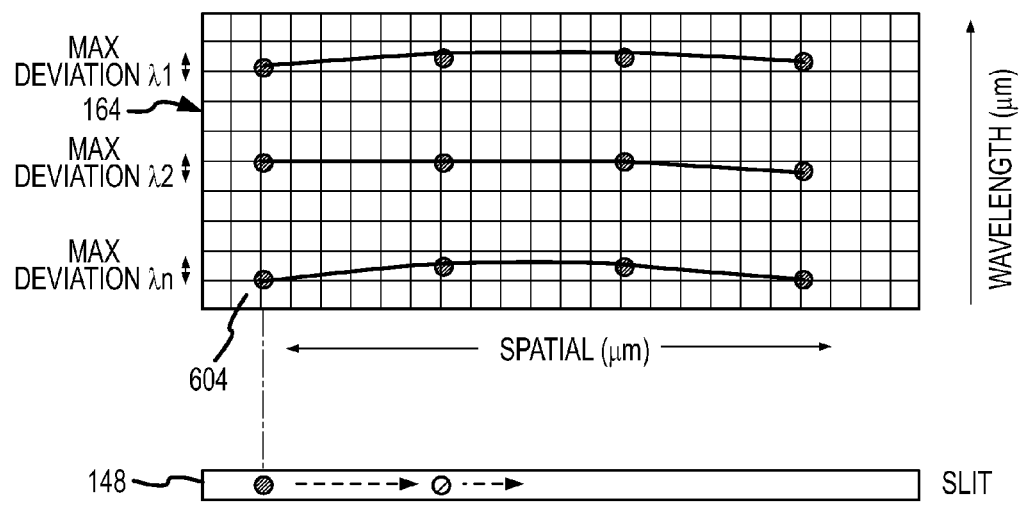
FIG. 8 depicts spectral smile measurement of an instrument under test in accordance with embodiments of the present invention.

Another form of distortion that can be measured using a test instrument 104 in accordance with embodiments of the present invention, is spectral smile. An example of spectral smile is illustrated in FIG. 8. In particular, spectral smile appears as a shift in the detected wavelength or more precisely a shift in the row (or alternatively columns) of pixels on which a particular wavelength is incident, for a change in the spatial location at the slit 148 plane. Different positions along the length of the slit 148 can be sampled by translating the test instrument 104 on a precision stage so that the image of the pinhole 128 is translated along the slit 148 of the instrument under test 108. The spectral smile is the maximum deviation in the spectral direction along each wavelength. In the example of FIG. 8, a comb of transmission peaks from the Fabry-Perot interferometer or etalon 116 of the test instrument 104 are shown dispersed onto the sensor array 164 at four different spatial locations (i.e. scanned in the spatial dimension). Because energy at a number of wavelengths is provided to the instrument under test 108 simultaneously, spectral smile measurements can be made at a number of wavelengths simultaneously, reducing the amount of time required to characterize the spectral smile of the instrument under test 108.

Figure 9:
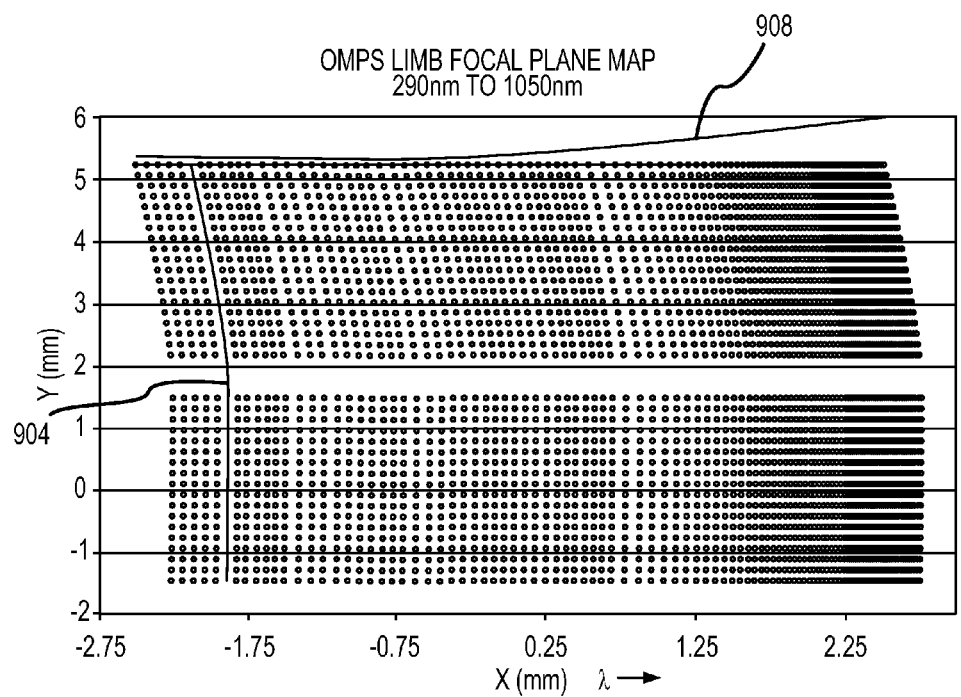
FIG. 9 depicts spectral smile and keystone distortion measurement of an instrument under test in accordance with embodiments of the present invention.

In FIG. 9, spectral smile and keystone distortion in an instrument under test 108 from data collected at a number of wavelengths and spatial locations are illustrated. Both keystone distortion and spectral smile are centroid based measurements. As noted, in accordance with embodiments of the present invention, a number of wavelengths can be provided at a slit 148 of the instrument under test 108 simultaneously, and these wavelengths can be scanned along the slit 148 of the instrument under test 108, to characterize spectral smile at different wavelengths. The general contour of the spectral smile is depicted as line 904. Because a number of wavelengths are provided to the instrument under test 108 simultaneously, embodiments of the present invention allow for the characterization of keystone distortion to be obtained by direct measurement. The general contour of the keystone distortion is depicted by line 908.

Figure 10A:
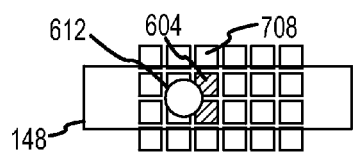
FIGS. 10A-10C illustrate spatially scanning at a discrete wavelength provided by a test instrument across a column of pixels in accordance with embodiments of the present invention.
Figure 10B:
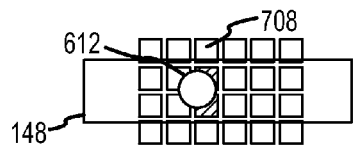
Figure 10C:
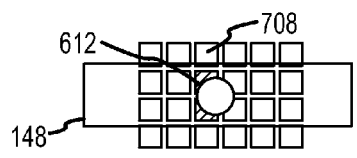
Figure 11:
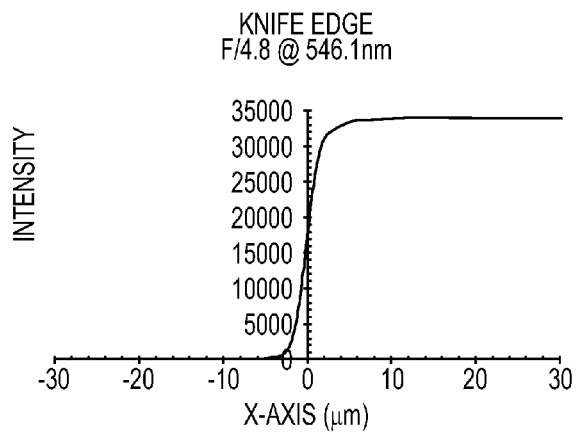
FIG. 11 illustrates a plot of measured intensities from pixels within a column of pixels included in a sensor array in response to spatially scanning energy across those pixels in accordance with embodiments of the present invention.
Figure 12:
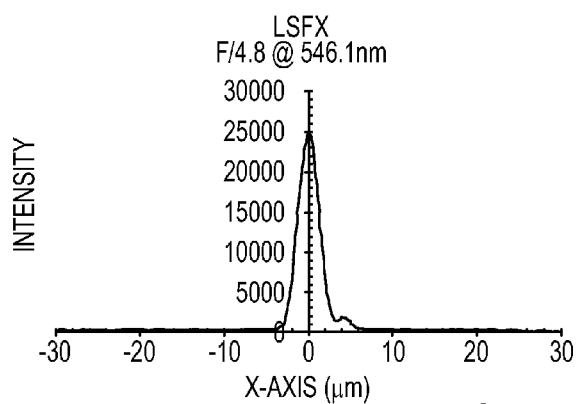
FIG. 12 is a plot of the derivative of the measured intensities illustrated in FIG. 11. in accordance with embodiments of the present invention.
Figure 13:
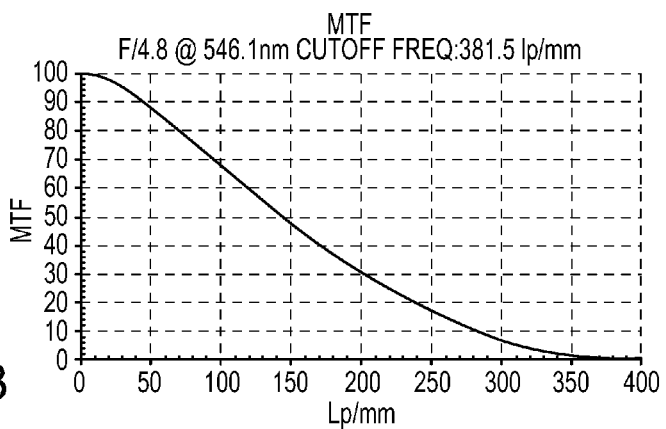
FIG. 13 illustrates the modulation transfer function of an example instrument under test in accordance with embodiments of the present invention.

In order to obtain the modulation transfer function (MTF) of the instrument under test 108, a spot corresponding to a wavelength or spectral line provided by the test instrument 104 is scanned along the slit 148 of the instrument under test 108. Measurements of the intensity of the spot at the pixel or pixels in a single column of pixels on which the spot 612 is incident are then taken as the spot 612 comprising the transmission line is spatially scanned. Scanning of the spot 612 at three separate points in time is illustrated in FIGS. 10A-10C. A plot of measured intensities from pixels 604 within the column of pixels 708 is illustrated in FIG. 11. The derivative of the plot of measured intensities with respect to distance is then taken to obtain the line spread function (LSF) for the instrument under test 108 illustrated in FIG. 12. Finally, a fast Fourier transform of the LSF is taken to obtain the modulation transfer function (MTF) of the instrument under test 108, illustrated in FIG. 13.

Figure 14:
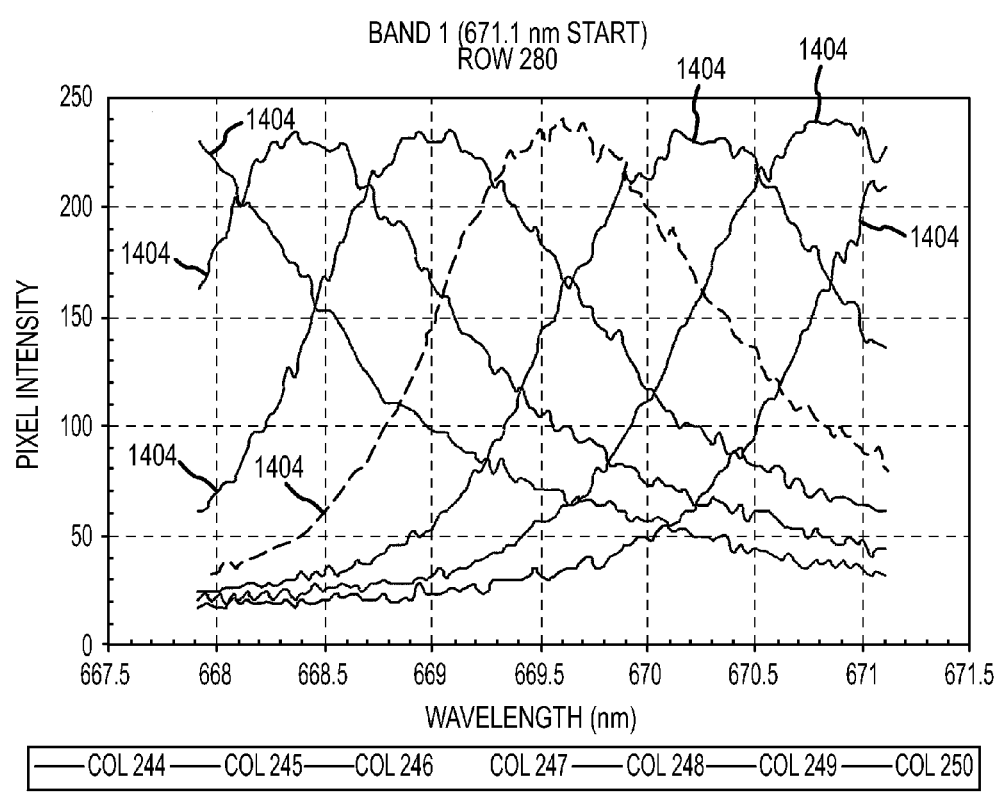
FIG. 14 illustrates plots of the response of pixels in different columns of an array as an input wavelength is scanned across the sensor array in the spectral dimension in accordance with embodiments of the present invention.

FIG. 14 illustrates the response of pixels 603 in different columns 708 of an array 164 included in an instrument under test 108. More particularly, each line 1404 illustrated in FIG. 14 represents the intensity measured by a pixel within a different column with respect to energy provided by a test instrument 104, as the transmission line is scanned in wavelength by adjusting the optical distance between the plates 120, 124 of the Fabry-Perot etalon 116. The transmission line may be scanned in increments of about 0.15 nm to obtain a plot as illustrated in FIG. 14. From the information obtained regarding the sensitivity of different columns of pixels in an array 164 to different wavelengths, the wavelength at which each column exhibits maximum sensitivity can be characterized.

As discussed herein, the Fabry-Perot etalon 116 produces a periodic instrument function where the separation between adjacent transmission peaks is defined by the free spectral range (FSR). This allows a large number of spectral lines within the instrument spectral range to be measured simultaneously, thereby fully characterizing the performance of the instrument. Therefore, the Fabry-Perot etalon can be used to provide a series of narrow spectral lines simultaneously from a single point source.

In general, testing of an instrument 108 proceeds by sub-sampling the instrument spectral response function of the instrument under test. A Fabry-Perot FWHM that is some fraction of the instrument SRF is selected. For example, a set of transmission lines that each have a FWHM value that is $\frac{1}{5}^{th}$ of the SRF of the instrument under test 108 can be used to adequately sub-sample the SRF of the instrument under test 108. That is, the finesse of each wavelength output by the test instrument 104 should be sufficiently high. Furthermore, by incrementally adjusting the air space between the plates 120, 124, or by otherwise changing the optical path between the plates 120, 124, the output from the test instrument 104 can be scanned in wavelength. The width of the SRF of the instrument under test 108 can then be determined by measuring the $SRF_{FWHM}$ across a single pixel, or spectral response element 604.

If the SRF were to change, for example due to spectral smile across the length of slit 148, then the centroid of the $SRF_{FWHM}$ would shift in wavelength space, and this can be determined directly from the SRF measurement. In addition, several spectral lines (the number is at the discretion of the test conductor) can be sampled simultaneously at the FPA 164, so the SRF for the entire spectrometer's 108 spectral range can be measured simultaneously. This simultaneity in measurement for spectral bands also immediately allows for a direct measurement of keystone distortion, since all spectral lines originate from the same spatial location at the slit 148 plane. Different positions along the length of the slit 148 can be sampled by translating the instrument under test 108 (and/or the test instrument 104) on a precision stage so that the image of the pinhole is translated along the slit.

The monochromatic MTF of the instrument under test in the spatial direction can also be measured simultaneously at several wavelengths by scanning the pinhole (or a cross-slit slit) image across a pixel. Since several wavelengths are imaged on the FPA simultaneously, the MTF can be measured simultaneously at all these wavelengths, and the spatial MTF of the entire instrument spectral range determined in a single test.

Figure 15:
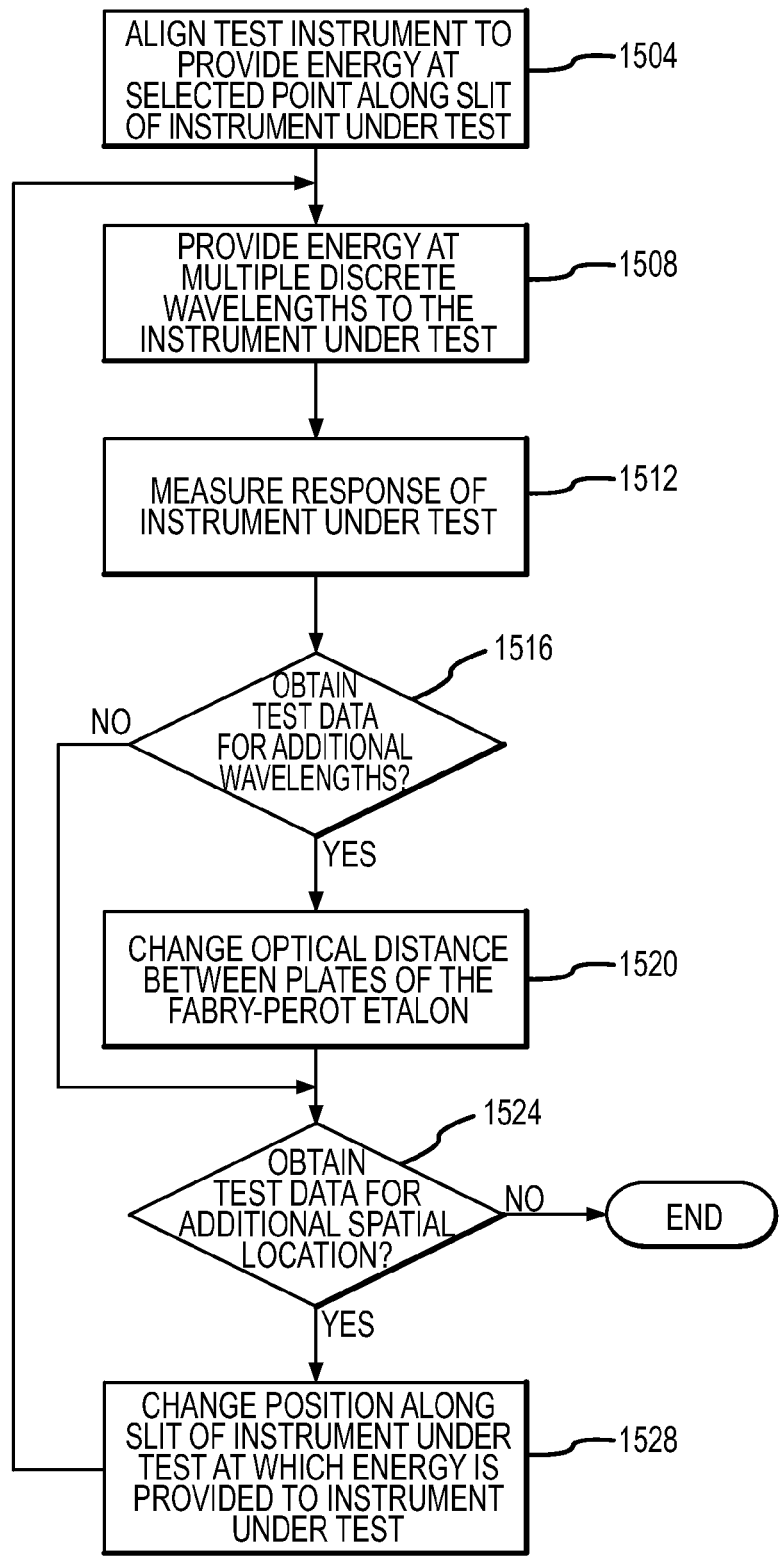
FIG. 15 illustrates aspects of a method for characterizing a hyperspectral instrument in accordance with embodiments of the present invention.

FIG. 15 illustrates aspects of a method for characterizing a hyperspectral instrument in accordance with embodiments of the present invention. Initially, the test instrument 104 is aligned to provide energy at a selected point along the slit 148 of the instrument under test 108 (step 1504). Energy at multiple discrete wavelengths is then provided to the instrument under test 108 (step 1508). The response of the instrument under test 108 to the provided energy can then be measured (step 1512).

At step 1516, a determination is made as to whether test data for additional wavelengths is to be obtained. If test data for additional wavelengths is to be obtained, the optical distance between the plates 120, 124 of the Fabry-Perot etalon 116 is changed (step 1520). After changing the optical distance between the plates 120, 124 of the etalon 116 or after determining that test data for additional wavelengths at the location along the slit 148 then selected is not to be obtained, a determination is made as to whether data for one or more additional spatial locations is to be obtained (step 1524). If test data for additional spatial locations is to be obtained, the position along the slit 148 of the instrument under test 108 at which energy is provided to that instrument 108 is changed (step 1528). The process may then return to step 1508. If it is determined that test data for additional spatial locations, is not required, the process may end.

The utility of this test approach can be illustrated by applying it to the SIRAS-G laboratory demonstration instrument (the instrument under test 108 in the example). The SIRAS-G laboratory demonstration instrument is an imaging spectrometer designed to operate over the 3.35 µm to 4.8 µm spectral range with a spectral resolution of between 0.65 cm$^{-1}$ and 1.33 cm$^{-1}$, (0.9 cm$^{-1}$ at the center wavelength of 4.075 µm). The focal plane array 164 is a 1024×1024 array, with the spectrum dispersed over 1000 pixels in the spectral (Y) axis, and an object space field of view of 2.89° imaged over 1000 pixels 604 in the spatial axis (although the spectrometer camera operates over a 12.2° FOV). For this example, the pixel size and projected slit width relationship was selected based on the Nyquist criterion of 2 pixels per projected slit width. Therefore, a spectral resolution element is composed of two pixels (i.e., the slit width is equivalent to two pixels) and therefore there are 500 separate spectral resolution lines within the spectral range of the instrument. The as-designed spectral smile and keystone distortion of the SIRAS-G laboratory demonstration instrument is well-corrected, with maximum smile and keystone errors of less than 5-microns over the full extent of the FPA. The following lays out an example Fabry-Perot test instrument 104 that could be used for the testing of the SIRAS-G spectrometer. Note that the spectral characterization of the instrument under test 108 would be performed prior to integration of the SIRAS-G reflective triplet object. In this manner, the slit 148 is directly accessible and there is no need to expand the ray bundle to match the 210-cm SIRAS entrance aperture. On SIRAS-G the aft-optics assembly is mounted onto an optical bench that in enclosed in a dedicated thermal/vacuum enclosure operating at 150 K. The slit 148 is accessible optically through a silicon window and the focal plane assembly is maintained at approximately 60 K. By making the thermal-vacuum chamber an integral part of the SIRAS-G instrument, it is not necessary to mount the spectrometer into a separate thermal-vacuum chamber, simplifying the performance testing of this instrument 108. In addition, all test hardware, including the Fabry-Perot etalon and source assembly is located external to the thermal-vacuum chamber allowing easy access and the opportunity to adjust and retrofit the test apparatus without breaking vacuum.

Steps for Calculating Fabry-Perot Etalon Parameters for example Hyperspectral Test Facility or Instrument:

$\mu m := \cdot 10^{-3} \cdot mm$ $n_{air} := 1.0$ $nm := 1 \cdot 10^{-9} \cdot m$ Basic High Resolution Fabry-Perot parameters:

Define the spectral range of operation for the SIRAS-G laboratory Demonstration Instrument. Define F-P Plate Reflectance and Absorption Refl:=0.90 Reflectance of F-P Mirrors Abs:=0.01 Absorption in Etalon $$\lambda_{short} := 3.35 \; \mu m$$

$$\lambda_{long} := 4.80 \; \mu m$$

$$\lambda_c := \frac{\lambda_{long} + \lambda_{short}}{2}$$

$$\lambda_c = 4.075 \; \mu m$$

1) Determine Parameters for High-Resolution Fabry-Perot Etalon

What is desired spectral resolution at center wavelength?

Number of pixels in spectral direction: $n_{pixel} := 1000$

Number of spectral samples:

$$\lambda_{spectral} := \frac{n_{pixel}}{2}$$

$$\lambda_{spectral} = 500$$

Total number of spectral resolution element s is (1000/2)=500; 2 pixels per.

Desired Instrument Spectral Resolution:

$$\Delta\lambda_{inst} := \frac{(\lambda_{long} - \lambda_{short})}{n_{spectral}}$$

$$\Delta\lambda_{inst} = 2.9 \; nm$$

Nominal instrument spectral resolution (defined at center wavelength) is 2.9 nm, or a $\lambda/\Delta\lambda = 1405$ In order to sample the Instrument Spectral Response Function by a factor of 5, the F-P spectral resolution (FWHM) should be a factor of five finer than the instrument spectral resolution:

$$\Delta\lambda_{FP} := \frac{\Delta\lambda_{inst}}{5}$$

$$FWHM := \Delta\lambda_{FP}$$

$$\Delta\lambda_{FP} = 5.8 \times 10^{-4} \ \mu m$$

$$FWHM = 0.58 \ nm$$

Here we sub-sample the SIRAS-G Lab Demo Spectral Response Function (SRF) by a factor of 5.

Calculate Finesse:

$$F := \frac{\pi \cdot \sqrt{Refl}}{1 - Refl}$$

$$F = 29.804$$

The Finesse of the etalon is approximately 30, and is a function of the reflectivity of the surfaces of the etalon plate. This parameter can be optimized my adjusting the reflectivity, but may be constrained by what reflectance is attainable given spectral range and width of operation Calculate Order, Mo:

$$M_0 := \frac{\lambda_c}{\Delta\lambda_{FP} \cdot F}$$

$$M_0 = 235.737$$

The order of interference for the etalon at this spacing and at a wavelength of 4075 nm is ~236

Calculate Required Plate Separation:

$$s_{nom} := \frac{M_0 \cdot \lambda_c}{2n_{air} \cdot \cos(0)}$$

$$s_{nom} = 0.48031 \ mm$$

We find that the separation between plates for an air-gap etalon at the nominal wavelength of 4075 nm is 480.31 microns Calculate the Resolving Power of the F-P:
R:=$M_0 \cdot F$ R=7025.9

Calculate the Free Spectral Range $$FSR := \frac{\lambda_c}{M_0}$$

$$FSR = 17.286 \ nm$$

How Many Samples over the full Instrument Spectral Range does this amount to?

$$N_{samples} := \frac{\lambda_{long} - \lambda_{short}}{FSR}$$

$$N_{samples} = 83.882$$

The FSR is 17.3 nm, therefore the full spectral range of 1450 nm divided by the FSR yields a total number of ~84 transmission peaks that could be sampled. Since this is a relatively large number, and would lead to a large data set, we elect to reduce the number of spectral lines, by adding a second etalon in tandem (see next page)

B.) What change in spacing is required to sample next F-P Spectral Resolution Element?
Calculate Required Plate Separation:

$$s_2 := \frac{M_0 \cdot (\lambda_c + \Delta\lambda_{FP})}{2n_{air} \cdot \cos(0)}$$

$$s_2 = 0.48038 \ mm$$

$$\Delta s := s_2 - s_{nom}$$

$$\Delta s = 0.068 \ \mu m$$

$$\Delta s = 68.364 \ nm$$

2.) Determine Parameters for Low-Resolution Fabry-Perot Etalon

We want the Low Resolution F-P to have a FSR 4 time that of the High Resolution F-P:

$$FSR_{low} := 4 \ FSR$$

$$FSR_{low} = 0.069 \ \mu m$$

Calculate Order, Mo:

$$M_{0\_low} := \frac{\lambda_c}{FSR_{low}} \quad M_{0\_low} = 58.934$$

Here we calculate the parameters needed for a second F-P etalon that, when used in tandem with the high-resolution F-P etalon, will sample every fourth transmission peak.

Calculate Order, Mo:

$$M_{0\_low} := \frac{\lambda_c}{FSR_{low}}$$

$$M_{0\_low} = 58.934$$

Calculate SNR (Ratio of Max Transmission to Min. Transmission)

$$SNR := \frac{(1 + Refl)^2}{(1 - Refl)^2}$$

$$SNR = 361$$

Approximation:

$$SNR_2 := \frac{4 \cdot F^2}{\pi^2}$$

$$SNR_2 = 360$$

Calculate Required Plate Separation:

$$s_{low} := \frac{M_{0\_low} \cdot \lambda_c}{2 n_{air} \cdot \cos(0)}$$

$s_{low} = 0.12008$ mm

Ratio of Separations:

$$R_{sep} := \frac{s_{nom}}{s_{low}}$$

$R_{sep} = 4$

Note that the spacing is one-quarter of that for the high-resolution etalon

Calculate the Resolving Power of the Low Res F-P:
R:=$M_0 \cdot$F  R=7025.9

Calculate the Free Spectral Range $$FSR := \frac{\lambda_c}{M_{0\_low}}$$

$FSR = 69.145$ nm

How Many Samples over the full Instrument Spectral Range does this amount to?

$$N_{samples} := \frac{\lambda_{long} - \lambda_{short}}{FSR}$$

$N_{samples} = 21$

The calculations and assumptions set forth above demonstrate that the desired spectral properties needed to conduct spectral performance tests on the SIRAS-G laboratory demonstration instrument are feasible with a test instrument 104 in accordance with embodiments of the present invention. This test methodology is well suited to characterizing the performance of the SIRAS-G instrument. In addition, such test instruments 104 are feasible for use on future hyperspectral instrument programs, including HES.

While the implementation in the above example is for a MWIR instrument, the approach is equally well suited for testing from the UV to the LWIR. The basic components of the test set remain unchanged, although optical materials for the lenses and etalons will need to be optimized for spectral range, and an alternate source (high energy lamp) would be required in the VIS/NIR region.

As can be appreciated from the present description, the Fabry-Perot test facility or instrument 104 is composed of a number of components. The blackbody 112 and pinhole source 128 assembly can comprise standard laboratory equipment. Precision air-gap etalons 116 with accurate air-gap control have been developed. This technology is directly applicable to this system, although it should be noted that IR-transmitting etalon plates 120, 124 are required to test instruments 108 that operate at IR wavelengths, such as SIRAS-G. In accordance with embodiments of the present invention, off-the-shelf IR lenses from suitable manufacturers (e.g., JANOS, II-VI) can be utilized for the collimating and focusing 144 lens components.

TABLE 1 summarizes various measurement parameters concerning instrument under test 108 and how they are determined using a test instrument 104 in accordance with embodiments of the present invention

| Measurement Parameter | Approach | Benefits |
|---|---|---|
| Modulation Transfer Function (MTF) | The image of a pinhole, or more preferably a narrow slit (significantly thinner than a pixel and orthogonal to the instrument slit), is translated across a pixel and the Line Spread Function recorded. The MTF is then obtained by taking the Fourier Transform of the LSF. | The narrow F-P transmission function is effectively a monochromatic source, thus the MTF can be determined at discrete wavelengths. In addition, since a number of spectral images are produced simultaneously, the MTF at a give FPA axial position can be determined simultaneously in a single measurement. |
| Keystone Distortion | Keystone distortion is distortion introduced by the optical system when a single field point (within the slit) is dispersed onto the FPA in the spectral distortion. Since several spectral lines are imaged simultaneously by the F-P (and originating from the same slit position), keystone distortion can be measured directly without introduction of metrology or other spatial/spectral errors (Reference: FIG. 6). | The FPA is illuminated buy n-number of spectral images, all emanating from the same spatial location at the slit; thus, keystone distortion can be computed directly by measuring by how much the centroid of these images deviated from a straight line. |
| Spectral Smile | Spectral smile is the deviation of a line as projected from the slit onto the focal plane for a single wavelength. By measuring the SRF and determining the | No uncertainty in pixel spectral response as would be the case with a broadband. Characterization of the |

TABLE 1-continued summarizes various measurement parameters concerning instrument under test 108 and how they are determined using a test instrument 104 in accordance with embodiments of the present invention

| Measurement Parameter | Approach | Benefits |
|---|---|---|
| | spectral centroid for a spectral element (i.e., 2 pixels @ Nyquist sampling) at several spectral elements aling a row, the spectral elements along a row, the spectral smile can be measured directly and cast in terms of the instrument SRF (Reference: FIG. 7). | spectral response for each pixel measured is possible, overcoming the uncertainty which would result if a monochromatic source (i.e. laser) is employed. |
| SRF | Scan F-P transmission function to determine instrument line shape as determined by slit** instrument spectral response **pixel. | Full coverage - every pixel can be measured if desired. |
| Dispersion | Spectral features accessible over full extent of array allowing straightforward measurement or dispersion. | Full coverage - not just selected lines or cells, or other test targets. |

Although certain examples described herein have discussed providing energy comprising multiple discrete wavelengths at a single point along the slit of an instrument 108, other arrangements are possible. For example, embodiments of the present invention may be configured to provide energy at multiple discrete wavelengths and at multiple spatial locations simultaneously. Such embodiments may incorporate a beam splitter at the output of the instrument 104, in combination with fold mirrors in order to provide energy passed through the Fabry-Perot etalon 116 at multiple points along the slit 116 of the instrument under test 108.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed:

1. A method for characterizing spectrometer performance, comprising:

using a first test instrument, providing radiation including at least a first range of wavelengths from a continuum radiation source;

associating and aligning the first test instrument with an instrument under test;

using the first test instrument, simultaneously generating a first comb of transmission lines from the radiation including a first range of wavelengths using a tunable Fabry-Perot interferometer, wherein the Fabry-Perot interferometer is tuned to provide the first comb of transmission lines, and wherein the first comb of transmission lines comprises energy at a first plurality of wavelengths equally spaced from one another;

after associating and aligning the first test instrument with the instrument under test, outputting the first comb of transmission lines from the first test instrument;

while the first test instrument is associated and aligned with the instrument under test, simultaneously providing the first comb of transmission lines output from the first test instrument to the instrument under test;

simultaneously receiving at a sensor array of the instrument under test the first comb of transmission lines;

using the first test instrument, simultaneously generating a second comb of transmission lines from the radiation including a second range of wavelengths using the tunable Fabry-Perot interferometer, wherein the Fabry-Perot interferometer is tuned to provide the second comb of transmission lines, and wherein the second comb of transmission lines comprises energy at a second plurality of wavelengths equally spaced from one another, wherein the first plurality of wavelengths is different than the second plurality of wavelengths;

while the first test instrument is associated and aligned with the instrument under test, simultaneously providing the second comb of transmission lines output from the first test instrument to the instrument under test;

simultaneously receiving at the sensor array of the instrument under test the second comb of transmission lines; and measuring a spectral response function of the instrument under test, wherein the measuring a spectral response function of the instrument under test includes measuring a response of the instrument under test with respect to the plurality of transmission lines included in the first comb of transmission lines provided to the instrument under test simultaneously and simultaneously received at the sensor array of the instrument under test, and wherein the measuring a spectral response function of the instrument under test includes measuring a response of the instrument under test with respect to the plurality of transmission lines included in the second comb of transmission lines provided to the instrument under test simultaneously and simultaneously received at the sensor array of the instrument under test.

2. The method of claim 1, wherein the response of the instrument under test comprises performance parameters, wherein the performance parameters include instrument keystone, wherein measuring the keystone includes sequentially mapping a plurality of discrete wavelengths dispersed along a spectral dimension of the instrument under test that are obtained simultaneously from illuminating an individual field point in a slit of the instrument under test and repeating the measurement at a plurality of locations along a length of the slit.

3. The method of claim 1, wherein the response of the instrument under test comprises performance parameters, wherein the performance parameters include instrument spectral smile, wherein measuring the spectral smile includes sequentially mapping a plurality of discrete wavelengths dispersed along a spectral dimension of the sensor array of the instrument under test, wherein the plurality of discrete wavelengths are obtained simultaneously as part of the comb of transmission lines, and wherein the sequentially mapping is performed at a plurality of locations along a slit of sad the instrument under test.

4. The method of claim 1, wherein the response of the instrument under test comprises performance parameters include instrument modulation transfer function (MTF) at discrete wavelengths, wherein measuring the MTF includes mapping a plurality of discrete wavelengths dispersed along a spectral dimension of the sensor array of the instrument under test across a focal plane of the instrument under test, and wherein at least a number of pixels are illuminated simultaneously.

5. The method of claim 1, wherein the tuning the Fabry-Perot interferometer includes incrementally tuning the Fabry-Perot interferometer between at least first and second interferometer settings, wherein the comb of transmission lines is scanned in wavelength space, and wherein the measuring a spectral response function of said instrument under test includes measuring a response of the instrument under test with respect to a number of transmission lines at the at least first and second interferometer settings simultaneously at each of the first and second interferometer settings and at a third interferometer setting between the first and second interferometer settings.

6. The method of claim 5, wherein the incrementally tuning comprises altering an effective etalon spacing of the Fabry-Perot interferometer.

7. The method of claim 1, wherein the instrument under test includes an entrance slit, collimating optics, a diffraction grating imaging optics, and a sensor array having a plurality of pixels, wherein the measuring a spectral response function of the instrument under test includes scanning over the array in a wavelength dimension by incrementally adjusting an etalon spacing of the Fabry-Perot interferometer over a limited range and scanning over the array in a spatial dimension through the use of external beam-steering optics.

8. The method of claim 7, wherein sad the instrument under test comprises an imaging spectrometer.

9. The method of claim 7, wherein the plurality of pixels in at least the wavelength dimension are illuminated simultaneously.

10. The method of claim 1, wherein the generating a comb of transmission lines using a tunable Fabry-Perot interferometer includes passing radiation from the continuum energy source through at least a first and second Fabry-Perot interferometers, and wherein at least one of the Fabry-Perot interferometers is tunable.

11. The apparatus of claim 1, further comprising:
after measuring a spectral response function of the instrument under test, disassociating the first test instrument from the instrument under test.

* * * * *